(12) United States Patent
Johnson, Sr.

(10) Patent No.: US 10,663,107 B2
(45) Date of Patent: *May 26, 2020

(54) REMOVABLE TRIPOD WITH SECUREMENT

(71) Applicant: Really Right Stuff, LLC, Lehi, UT (US)

(72) Inventor: Joseph M. Johnson, Sr., Lehi, UT (US)

(73) Assignee: Really Right Stuff, LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,840

(22) Filed: Oct. 7, 2019

(65) Prior Publication Data

US 2020/0032951 A1 Jan. 30, 2020

Related U.S. Application Data

(63) Continuation of application No. 16/436,395, filed on Jun. 10, 2019, now Pat. No. 10,473,261, which is a continuation of application No. 16/294,137, filed on Mar. 6, 2019, now Pat. No. 10,359,147, which is a continuation of application No. 16/101,848, filed on Aug. 13, 2018, now Pat. No. 10,267,452, which is a continuation of application No. 15/782,167, filed on Oct. 12, 2017, now Pat. No. 10,054,256, which is a continuation of application No. 15/605,511, filed on May 25, 2017, now Pat. No. 9,816,662, which is a continuation of application No. 15/293,764, filed on Oct. 14, 2016, now Pat. No. 9,689,525, which is a continuation of application No. 13/366,080, filed on Feb. 3, 2012, now Pat. No. 9,494,276.

(60) Provisional application No. 61/489,179, filed on May 23, 2011.

(51) Int. Cl.
| | |
|---|---|
| *A47B 91/00* | (2006.01) |
| *F16M 11/36* | (2006.01) |
| *G03B 17/56* | (2006.01) |
| *F16B 7/18* | (2006.01) |

(52) U.S. Cl.
CPC ............ *F16M 11/36* (2013.01); *F16B 7/182* (2013.01); *G03B 17/561* (2013.01); *F16M 2200/08* (2013.01)

(58) Field of Classification Search
CPC ... A45F 3/44; E04H 12/2223; E04H 12/2215; F16M 11/32; F16M 11/36; A47B 91/00; A47B 13/021; A47B 1/024
USPC .... 248/545, 688, 530, 156, 159, 163.1, 188, 248/188.8, 188.9; 108/156
See application file for complete search history.

(56) References Cited

U.S. PATENT DOCUMENTS

| | | | | |
|---|---|---|---|---|
| 2,654,620 | A | * 10/1953 | Tinnerman | ............ A47B 91/06 138/89 |
| 2,868,602 | A | * 1/1959 | Drezner | ................ F16B 12/48 403/298 |
| 4,079,908 | A | * 3/1978 | Davis | ...................... A45F 3/44 248/156 |

(Continued)

*Primary Examiner* — Bradley Duckworth
(74) *Attorney, Agent, or Firm* — Chernoff, Vilhauer, McClung & Stenzel, LLP

(57) ABSTRACT

Installation of a removable tripod foot is facilitated by a cross-axis aperture in the foot and loosening of the threaded connection of the foot and the tripod's leg is resisted by a resilient element engaging interfacing surfaces of the foot and the leg.

12 Claims, 4 Drawing Sheets

(56) References Cited

U.S. PATENT DOCUMENTS

| | | | | |
|---|---|---|---|---|
| 5,046,693 A * | 9/1991 | Browne | ............... | F16B 9/023 |
| | | | | 248/159 |
| 6,629,506 B2 * | 10/2003 | Park | ............... | A47B 9/18 |
| | | | | 108/156 |
| 6,669,153 B1 * | 12/2003 | Allan | ............... | A47B 91/00 |
| | | | | 248/188.9 |
| 6,908,067 B2 * | 6/2005 | Clasen | ............... | E04H 12/2223 |
| | | | | 248/533 |
| 7,264,210 B2 * | 9/2007 | Yu | ............... | A45F 3/44 |
| | | | | 135/16 |
| 7,520,485 B1 * | 4/2009 | Giannetto | ............... | A01K 97/10 |
| | | | | 173/91 |
| 8,398,037 B2 * | 3/2013 | Johnson | ............... | F16M 11/32 |
| | | | | 248/163.2 |
| 10,054,256 B2 * | 8/2018 | Johnson, Sr. | ............... | F16B 7/182 |
| 2002/0109053 A1 * | 8/2002 | Lemieux | ............... | F16M 11/14 |
| | | | | 248/187.1 |
| 2004/0227040 A1 * | 11/2004 | Crain | ............... | F16B 7/1463 |
| | | | | 248/188.8 |
| 2005/0161560 A1 * | 7/2005 | Kjellman | ............... | F16M 11/16 |
| | | | | 248/163.1 |
| 2008/0251663 A1 * | 10/2008 | Tracy | ............... | A47B 91/00 |
| | | | | 248/188.8 |
| 2009/0278020 A1 * | 11/2009 | Marcil | ............... | A45F 3/44 |
| | | | | 248/545 |
| 2010/0005701 A1 * | 1/2010 | Santiago | ............... | A01K 97/10 |
| | | | | 43/21.2 |

* cited by examiner

REMOVABLE TRIPOD WITH SECUREMENT

CROSS-REFERENCE TO RELATED APPLICATIONS

This application is a continuation of U.S. patent application Ser. No. 16/436,395, filed Jun. 10, 2019, which is a continuation of U.S. patent application Ser. No. 16/294,137, filed Mar. 6, 2018, now U.S. Pat. No. 10,359,147, issued Jul. 23, 2019, which application is a continuation of U.S. patent application Ser. No. 16/101,848, filed Aug. 13, 2018, now U.S. Pat. No. 10,267,452, issued Apr. 23, 2019, which application is a continuation of U.S. patent application Ser. No. 15/782,167, filed Oct. 12, 2017, now U.S. Pat. No. 10,054,256, issued Aug. 21, 2018, which application is a continuation of U.S. patent application Ser. No. 15/605,511, filed May 25, 2017, now U.S. Pat. No. 9,816,662, issued Nov. 14, 2017, which application is a continuation of U.S. patent application Ser. No. 15/293,764, filed Oct. 14, 2016, now U.S. Pat. No. 9,689,525, issued Jun. 27, 2017, which application is a continuation of U.S. patent application Ser. No. 13/366,080, filed Feb. 3, 2012, now U.S. Pat. No. 9,494,276, issued Nov. 15, 2016, which application claims the benefit of U.S. Provisional App. No. 61/489,179, filed May 23, 2011.

BACKGROUND OF THE INVENTION

The present invention relates to a removable foot for a tripod and, more particularly, to a mechanism to aid in tightening and to resist loosening of a threaded connection between a foot and a leg of a tripod.

Tripods are used for both still and motion photography to provide stability and prevent unintended movement of the camera. A tripod reduces camera movement to enable the sharpest image and is especially useful when using a telephoto lens or longer exposure time because any camera movement while the shutter is open will blur the image. A tripod also aids in framing an image or in capturing multiple images of the same scene, for example when bracketing an exposure. A tripod enables controlled movement of the camera when panning, facilitating tracking a moving subject with a motion video camera or capturing multiple stills for a panoramic image.

Removable feet can increase the utility of a tripod by enabling use of specialized feet for particular surfaces and conditions. However, removable feet are commonly attached to a tripod's legs by screw threads which can be difficult to tighten and may loosen making the tripod unstable and increasing the likelihood that a foot will be lost. What is desired, therefore, is a removable tripod foot that is easy to install and resists loosening.

DETAILED DESCRIPTION OF PREFERRED EMBODIMENTS

Figure 1:
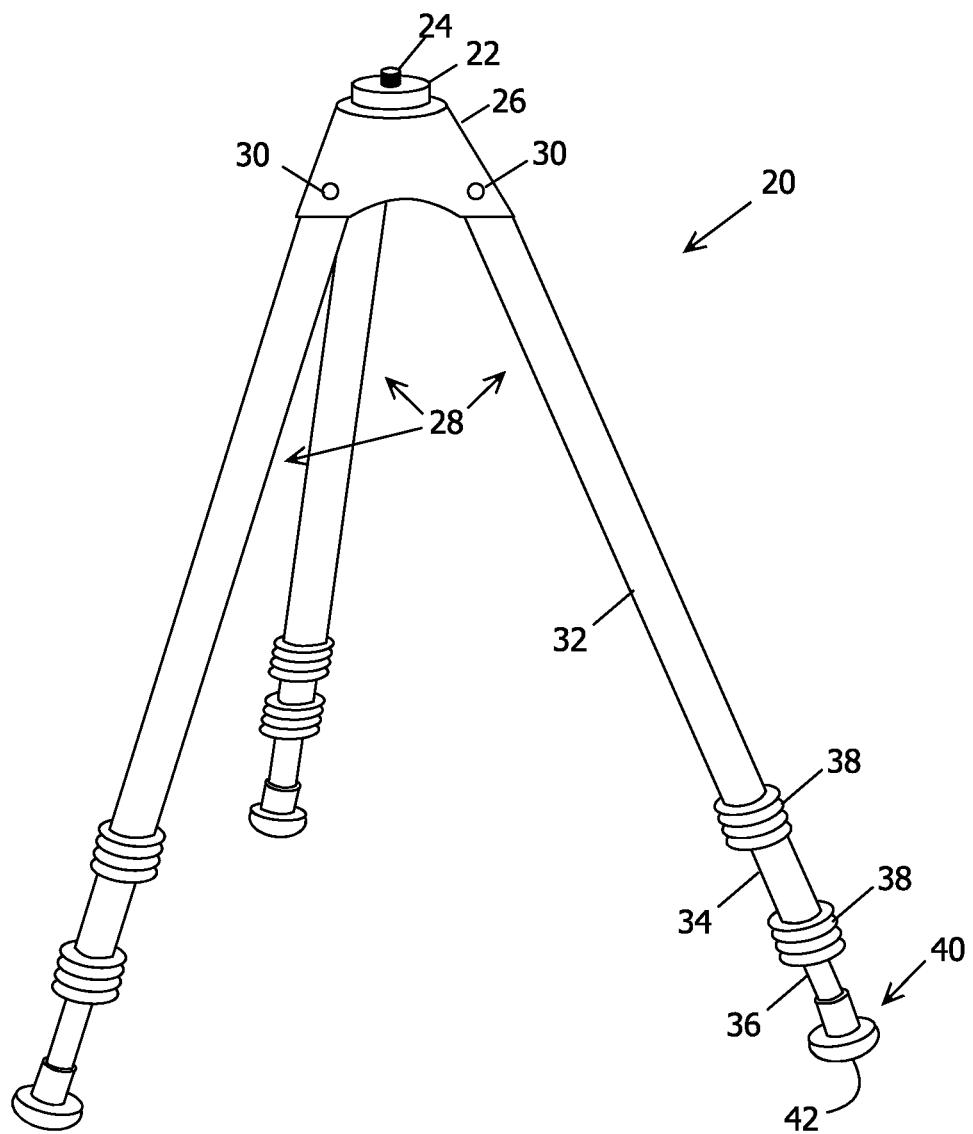
FIG. 1 is perspective view of a tripod.

Referring in detail to the drawings where similar parts are identified by like reference numerals, and, more particularly to FIG. 1, a tripod 20 is useful for both still and motion photography. Typically, a tripod comprises an apex mount 22 including a mechanism, such as a threaded stud 24, for securing a camera or an intermediate interface, such as a ball head or panoramic element, to which a camera can be secured. The apex mount 22 is secured to an apex structure 26 which is also the anchor point for the three legs 28 of the tripod. Each of the legs is typically secured to the apex structure 26 by a pivot joint 30 enabling the legs to be pivoted toward each other for transport and pivoted apart when the tripod is deployed for use. The legs 28 commonly comprise a plurality of leg sections, such as the three leg sections 32, 34, and 36, that telescope together to reduce the length of the collapsed tripod for transport or to enable adjustment of the height of the deployed tripod or compensation for an irregular supporting surface. A locking mechanism 38 which may be actuated by twisting secures the relative positions of the telescoping tube sections. Photographic tripods are preferably light weight and compact to facilitate transportation and the leg sections commonly comprise tubes of light weight materials such as aluminum or carbon fiber.

Figure 2:
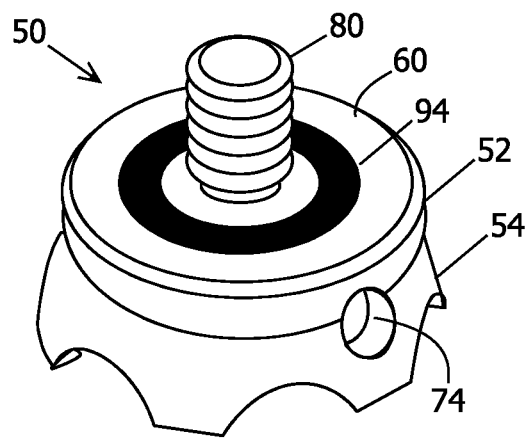
FIG. 2 is a perspective view of a claw-type tripod foot.
Figure 3:
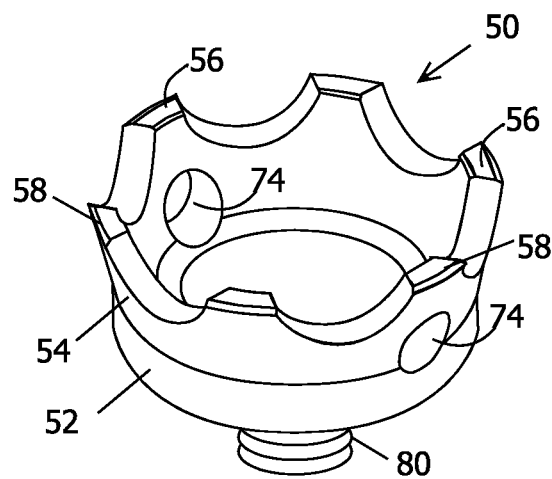
FIG. 3 is a perspective view of the underside to the claw-type foot of FIG. 2.
Figure 4:
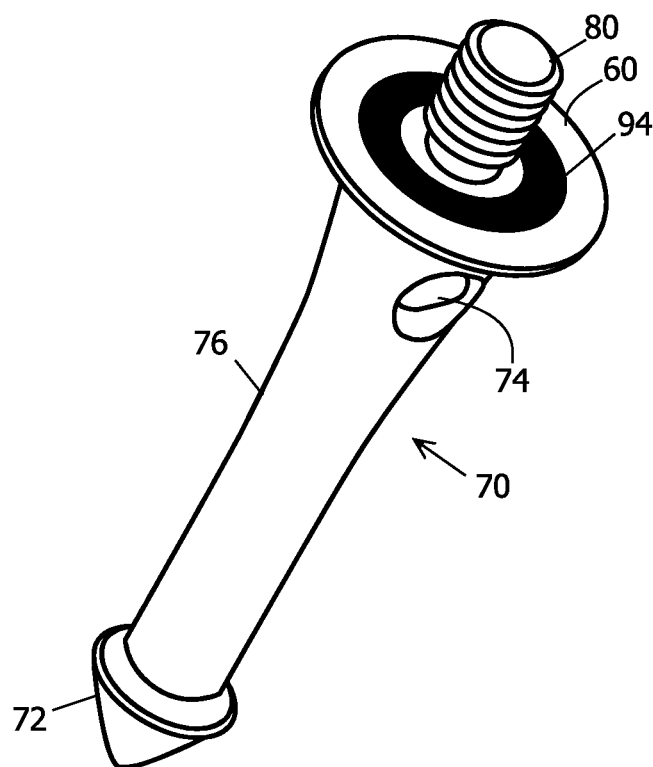
FIG. 4 is a perspective view of a spike tripod foot.

Tripod feet 40 provide the interface between the legs of the tripod and the surface on which the tripod will be supported. The tripod feet commonly have a curved lower surface 42 which is often covered with rubber or plastic to resist sliding on a floor or other supporting surface. While the feet may be permanently affixed to the legs of the tripod, the feet are often removable enabling more specialized feet to be substituted when desired. Referring FIGS. 2 and 3, for example, one type specialized tripod foot is a claw foot 50 having body 52 comprising a crenated wall 54 with a plurality of facets 56 along the lower edge. The sharp edges 58 at the intersections of the facets are intended to bite into a hard, rough surface and secure the tripod even if the surface is wet. Referring to FIG. 4, another type of specialized tripod foot is a spike foot 70. The pointed end portion 72 of the foot's spike-like body 76 is intended to penetrate loose surface material providing additional support on shifting surfaces or in strong winds.

Figure 5:
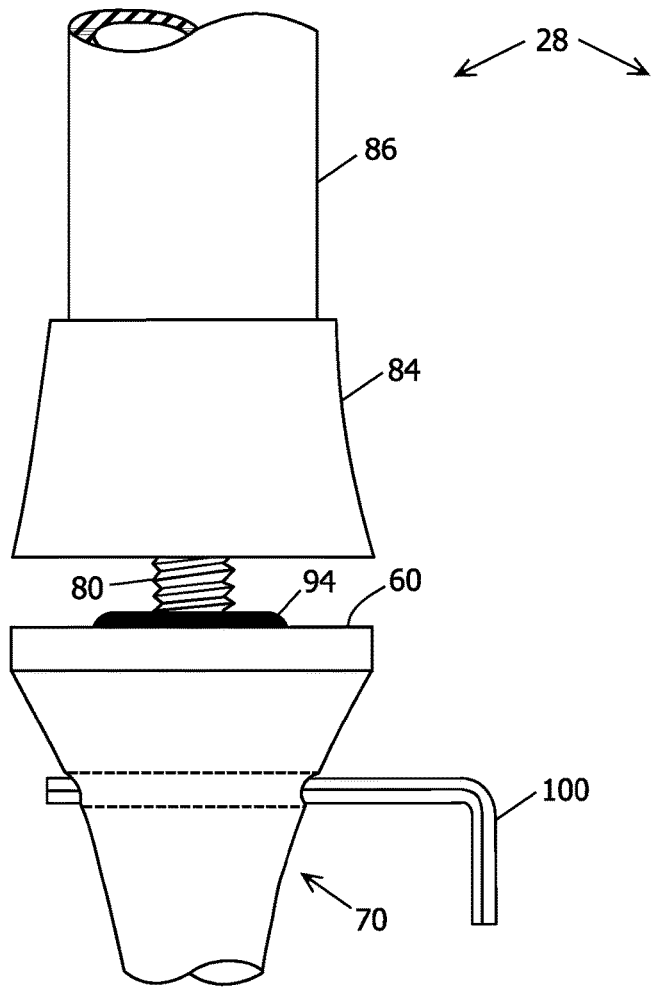
FIG. 5 is an elevation view of a portion of a tripod leg and a removable foot.
Figure 6:
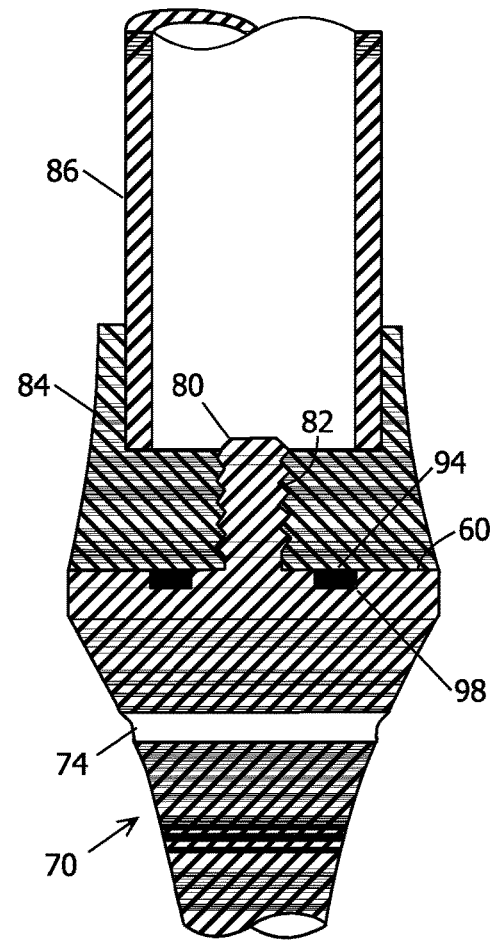
FIG. 6 is a section view of a portion of a tripod leg and a removable foot.
Figure 7:
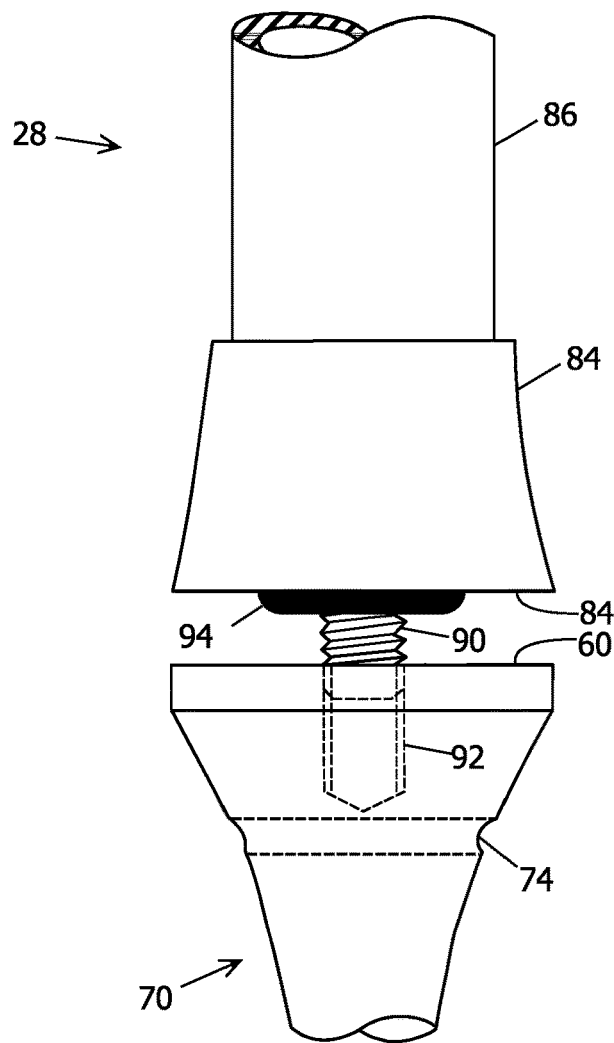
FIG. 7 is an elevation view of a portion of a tripod leg and a removable foot of a second embodiment.

Referring to also FIGS. 5 and 6, replaceable tripod feet are commonly affixed to the leg of the tripod by screwing a threaded stud 80 projecting from the foot into a threaded aperture 82 in a ferrule 84 which is secured to the end of a tubular leg section 86. On the other hand, referring to FIG. 7, the gender of the threads in the ferrule and the foot may be reversed with male threads of a threaded stud 90 projecting from the ferrule to engage female threads in an aperture 92 in the foot. While a threaded connection makes replacement straight forward, it can be difficult to fully tighten the threaded connection. The feet can also loosen as a result of cyclic loads and vibration as the tripod is repeatedly deployed or moved across a supporting surface; a condition that is exacerbated by the difficulty in tightening the feet. When the threaded feet loosen, the tripod becomes unstable and the feet may eventually become detached from the tripod. To prevent the removable feet from loosening, a liquid thread locker is commonly applied to the threads but this is time consuming and the container may leak damaging other equipment in a camera bag. On the other hand, threaded connections with prevailing torque features increase the torque required to tighten, as well as loosen, the connection making tightening and removal more difficult and the features may wear and become ineffective with repeated use. The applicants concluded that a mechanism that would permit removable tripod feet to be easily tightened but would reliably resist loosening would substantially improve the utility of a tripod.

Figure 8:
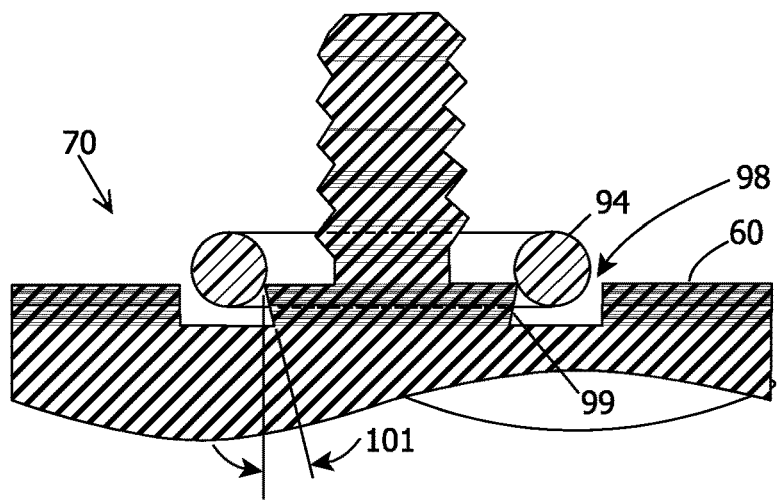
FIG. 8 is an enlarged view of a portion of the section of FIG. 6.

The removable feet 50, 70 for use with the tripod 20 include a resilient element 94 at the interface between the foot and the ferrule 84 secured to the end of the tripod's leg 28. As illustrated in FIG. 5, the resilient element 94 may be supported by the leg engaging surface 60 of the removable foot, but, referring to FIG. 7, the resilient element 94 could be applied to the foot engaging surface 96 of the ferrule 84. The resilient element increases friction between the interfacing surfaces of the foot and the ferrule to resist loosening of the threaded connection. While the elastomeric element could have any shape and could be applied to the respective surface, it is, preferably, a toroidal element, and, more preferably, an elastomeric o-ring installed in a groove 98 in one of the interfacing surfaces 60, 96. Referring also to FIG. 8, the groove 98 has an inner wall 99 which is undercut at an angle 101. The diameter of the groove at the point of intersection of the inner wall with the interfacing surface 60 is slightly greater than the inner diameter of the resilient element 94. When the resilient element is installed in the groove it must be stretched slightly. When the resilient element is released in the groove, it returns to its original size and is trapped in the groove against the sloping inner wall. On the other hand, the resilient element could be retained in the groove by an outer wall that sloped to a diameter, at the interfacing surface, that is slightly smaller than the outer diameter of the resilient element. A portion of the resilient element projects proud of the respective leg engaging surface 60 or foot engaging surface 96 so that the resilient element is compressed when the threaded connection is tightened. While an o-ring is inexpensive, the dimensions and characteristics of o-rings are carefully controlled and the force exerted by the o-ring is predictable enabling the foot to be tightened so that the interfacing surfaces 60 and 96 come in contact. Contact between the rigid leg engaging and foot engaging surfaces enhances the stability of the foot and the tripod and increases friction in the threaded connection which resists loosening. The compressed resilient element exerts a resilient separating force at the interfacing surfaces maintaining friction in the engaged screw threads during vibration and cyclic loading and resisting loosening of the threaded connection. Since the resilient element 94 does not come in contact with both of the interfacing surfaces until the surfaces are proximate each other, the foot screws easily into the ferrule for a major portion of the length of the threaded connection.

To compress the resilient element and bring the leg engaging surface into contact with the foot engaging surface, an aperture(s) 74 which extends substantially normal to the longitudinal axis of the threaded element in the foot is provided in the body of the foot. A tool, such as a rod, an Allen wrench 100 or the shank of a screw driver can be inserted into the aperture providing the necessary leverage to fully tighten the threaded connection.

The resilient element at the interfacing surfaces of a removable foot and a tripod leg and a cross-axis aperture facilitates installation of the foot and resists loosening of the threaded connection.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

I claim:

1. A foot for a tripod comprising:
   (a) a body including an interface surface including a portion arranged to engage a terminal portion of a leg of a tripod and an elongate threaded portion arranged substantially normal to the portion of the interface surface;
   (b) a resilient element engaging the interface surface;
   (c) wherein said resilient element extends proud of the portion of said interface surface arranged to engage the leg of the tripod;
   (d) wherein said interface surface includes an outer peripheral edge and said resilient element is sized such that at least a portion is within said outer peripheral edge of said interface surface when engaged therewith;
   (e) wherein said resilient element has an outer diameter and further said body includes a body outer peripheral surface with an outer diameter proximate said outer peripheral edge, where the resilient element outer diameter extends proud of the body outer peripheral surface;
   (f) wherein said body includes a crenated wall defining a plurality of facets arranged to engage a surface supporting said tripod, wherein each of said facets has an end portion thereof to engage said surface supporting said tripod.

2. The foot for said tripod of claim 1 wherein a respective arc is defined in said crenated wall extending the entire distance between each of said plurality of facets, where each of said respective arc does not define a discontinuity therein between each of said plurality of facets.

3. The foot for said tripod of claim 2 wherein said body defining an opening extending completely there through at a location between said interface surface and an end of said body furthest distant from said terminal portion of said leg of said tripod when said body is engaged with said terminal portion of said leg of said tripod.

4. The foot for said tripod of claim 3 wherein said body defines said opening in said body at a location directly above a first said facet at an elevation above the upper portion of each of said arc defined on either side of said first facet.

5. The foot for said tripod of claim 4 wherein said body defines said opening in said body at a location directly above a second said facet at an elevation above the upper portion of each of said arc defined on either side of said second facet.

6. The foot for said tripod of claim 5 wherein said opening is aligned with said elongate threaded portion.

7. The foot for said tripod of claim 1 wherein a respective arc is defined in said crenated wall extending between each of said plurality of facets.

8. The foot for said tripod of claim 7 wherein said body defines a lower exterior surface at an elevation below said upper exterior surface and adjacent thereto.

9. The foot for said tripod of claim 8 wherein said upper exterior surface and said lower exterior surface define a discontinuity therein around said body.

10. The foot for said tripod of claim 1 wherein the interface surface includes a portion defining a circular groove and the resilient element comprises an elastomeric toroid retained in the groove with a portion of a surface of the resilient element projecting proud of the portion of the interface surface arranged to engage the leg of a tripod.

11. The foot for said tripod of claim 1 wherein said elongate threaded portion of said body comprises a portion defining a threaded aperture.

12. The foot for said tripod of claim 1 further comprising said tripod.

* * * * *

UNITED STATES PATENT AND TRADEMARK OFFICE
CERTIFICATE OF CORRECTION

| | |
|---|---|
| PATENT NO. | : 10,663,107 B2 |
| APPLICATION NO. | : 16/594840 |
| DATED | : May 26, 2020 |
| INVENTOR(S) | : Joseph M. Johnson, Sr. |

It is certified that error appears in the above-identified patent and that said Letters Patent is hereby corrected as shown below:

On the Title Page

Item (54), Column 1, Line 4: After "TRIPOD" insert --FOOT--; and

In the Specification

Column 1, Line 1 (in the Title): After "TRIPOD" insert --FOOT--.

Signed and Sealed this
Fourteenth Day of June, 2022

Katherine Kelly Vidal
*Director of the United States Patent and Trademark Office*